United States Patent
Lee et al.

(10) Patent No.: US 9,277,598 B2
(45) Date of Patent: Mar. 1, 2016

(54) INDUCTION HEATING COOKER

(75) Inventors: Sung Ho Lee, Suwon-si (KR); Jong Chull Shon, Suwon-si (KR); Min Gyu Jung, Suwon-si (KR); Ha Na Kim, Incheon (KR)

(73) Assignee: SAMSUNG ELECTRONICS CO. LTD., Suwon-Si (KR)

( * ) Notice: Subject to any disclaimer, the term of this patent is extended or adjusted under 35 U.S.C. 154(b) by 1008 days.

(21) Appl. No.: 13/428,053

(22) Filed: Mar. 23, 2012

(65) Prior Publication Data

US 2012/0248095 A1     Oct. 4, 2012

(30) Foreign Application Priority Data

Mar. 28, 2011    (KR) ........................ 10-2011-0027798

(51) Int. Cl.
*H05B 6/12*         (2006.01)
*H05B 6/06*         (2006.01)
*H05B 3/68*         (2006.01)

(52) U.S. Cl.
CPC ............ *H05B 6/1263* (2013.01); *H05B 6/1272* (2013.01); *H05B 2206/022* (2013.01); *H05B 2213/03* (2013.01); *Y02B 40/126* (2013.01)

(58) Field of Classification Search
CPC ............... H05B 6/1263; H05B 6/1272; H05B 2213/03; H05B 2206/022; Y02B 40/126
USPC ......... 219/620, 621, 622, 624, 626, 670, 660, 219/600, 623, 625, 627, 672–676, 661–667, 219/445.1; 363/21, 97
See application file for complete search history.

(56) References Cited

U.S. PATENT DOCUMENTS

| | | | |
|---|---|---|---|
| 2007/0164017 A1* | 7/2007 | Gouardo et al. | 219/626 |
| 2009/0212042 A1* | 8/2009 | Lee et al. | 219/624 |
| 2011/0132900 A1* | 6/2011 | Kinoshita et al. | 219/647 |

FOREIGN PATENT DOCUMENTS

| | | |
|---|---|---|
| EP | 2 028 912 | 2/2009 |
| EP | 2 094 060 A2 | 8/2009 |
| JP | 2010113886 A * | 5/2010 |
| WO | WO 2005104621 A1 * | 11/2005 |

OTHER PUBLICATIONS

Partial European Search Report for corresponding European Patent No. 12 16 0656.
Chinese Office Action issued Jun. 3, 2015 in corresponding Chinese Patent Application 201210086898.X.

\* cited by examiner

*Primary Examiner* — Quang Van
(74) *Attorney, Agent, or Firm* — Staas & Halsey LLP

(57) ABSTRACT

An induction heating cooker including a cooking plate on which a cooking vessel is placed, a plurality of heating coils disposed while being adjacent to one other below the cooking plate, and a Printed Circuit Board (PCB) on which circuits configured to drive the heating coils are placed, wherein the PCB is divided into a high frequency circuit part on which circuits characterized by high frequency are placed and a low frequency circuit part on which circuits characterized by low frequency are placed, and the high frequency circuit part is spaced apart from the low frequency circuit part by a predetermined distance. The interference between the high frequency circuit part and the low frequency circuit part is minimized while enhancing the operation efficiency of each heating coil. The assembly efficiency and the working efficiency are enhanced when an inverter circuit is wired to a corresponding heating coil.

18 Claims, 11 Drawing Sheets

(a) (b) (c)

(a)

(b)

(c)

INDUCTION HEATING COOKER

CROSS-REFERENCE TO RELATED APPLICATIONS

This application claims the benefit of Korean Patent Application No. 2011-0027798, filed on Mar. 28, 2011 in the Korean Intellectual Property Office, the disclosure of which is incorporated herein by reference.

BACKGROUND

1. Field

Embodiments of the present disclosure relate to an induction heating cooker capable of heating a vessel that is disposed at any place on a cooking plate.

2. Description of the Related Art

In general, an induction heating cooker is an apparatus configured to cooking foods by supplying a high frequency current to a heating coil to generate a high frequency magnetic field and by causing eddy currents in a cooking vessel (hereinafter referred to as a vessel) having a magnetic coupling with the cooking coil through the generated magnetic field such that the vessel is heated by Joule's heat generated through the eddy current to cook foods.

Inside a body, which forms an external appearance of an induction heating cooker, is fixedly provided with a plurality of heating coils to provide heat source. In addition, a cooking plate is provided on the body to place a vessel. A vessel line is engraved on a predetermined position of a cooking plate corresponding to a heating coil. The vessel line serves to indicate a position where a vessel is to be placed when a user cooks foods.

However, in order to cook food, that is, heating a vessel for foods by use of such as conventional induction heating cooker, a user needs to place the vessel exactly on the vessel line of the cooking plate, causing inconvenience to the user. If a user places on an area deviated from the vessel line, the cooking is not appropriately performed.

According to an induction heating cooker, which is developed as an effort to improve shortcomings associated with such a limited cooking region, has a plurality of heating coils disposed under the entire surface of a cooking plate, such that the cooking is performed regardless of the position of the cooking plate where a vessel is placed.

In order to supply a high frequency current to the plurality of heating coils in the induction heating cooker, a plurality of inverter circuits need to be provided corresponding to the number of the heating coils. The inverter circuits are placed on a printed circuit board (PCB) together with a subsidiary control unit (sub-microcomputer) that is configured to control the operation of each heating coil according to a control signal of a main control unit (main-microcomputer).

On the printed circuit board provided on the induction heating cooker, a circuit part characterized by high voltage/high frequency is not separately disposed from a circuit part characterized by low voltage/low frequency. In addition, a wire connected to a respective inverter circuit is connected to a respective heating coil. Accordingly, interference occurs between the wire, which is characterized by high frequency, and the subsidiary control unit, which is characterized by low frequency, and thus an output waveform of the subsidiary control unit is distorted and a communication error occurs between the main control unit and the subsidiary control unit, failing to operate each heating coil properly. In addition, the induction heating cooker has a connection structure in which a wire withdrawn from an inverter circuit is connected to a heating coil corresponding to the inverter circuit, thereby degrading assembly efficiency and work efficiency in wiring the heating coil with each of the corresponding inverter circuit.

In addition, the induction heating cooker has a structure, including a plurality of small heating coils, densely disposed under the cooking plate over the entire surface, and requires increased number of heating coils; and also increases the number of inverter circuits required.

In this case, increased number of inverter circuits need to be placed on a limited area of the PCB, thereby causing the PCB to have a very complicated circuit structure. Such a complicated circuit structure increases the signal waveform distortion caused by the interference between the high frequency circuit part and the low frequency circuit part on the PCB.

In addition, in order to cook food by use of the induction heating cooker, a user needs to place a vessel on a cooking plate and perform a vessel position detection operation to detect the position of the heating coil where the vessel is placed before the cooking is performed. Thereafter, the induction heating cooker performs the cooking by only operating a heating coil where the vessel is placed, according to the vessel position detection operation.

If a vessel placed on a heating coil occupies a critical percentage (40%, for example) of the area of the heating coil, that is, the occupancy ratio of a vessel (P) on a heating coil (L) (hereinafter referred to as a vessel occupancy ratio) exceeds a critical percentage of the area of the heating coil (L), the heating coil (L) is determined as a heating coil (L) having a vessel (P) placed thereon and is operated for cooking food. Meanwhile, if a vessel (P) is not placed on a heating coil (L), or even if a vessel (P) is placed on a heating coil (L) while the vessel (P) occupies an area of the heating coil (L) below a critical percentage (40%, for example), the heating coil (L) is determined as a heating coil which does not have a vessel (P) placed thereon and thus the heating coil (P) is not operated.

In general, a heating coil of an induction heating cooker is provided in a circular shape according to the shape of a vessel and the working efficiency of a coil wiring process. Alternatively, a heating coil of an induction heating cooker may be provided in an elliptical shape or a triangular shape according to the characteristics of the induction heating cooker.

If a plurality of heating coils having a circular shape (or an elliptical shape) are densely disposed over the entire surface of the cooking plate, a dead zone is formed between the heating coils. In this case, if a user performs cooking by use of a small vessel having a small bottom, the cooking may not be performed depending on the position where the small vessel is placed. That is, if a vessel having a small bottom area occupies a critical percentage of the area of a heating coil, the heating coil is determined as a heating coil where a vessel is placed and the heating coil is operated to cook food. In this case, one or more heating coils may be operated based on the vessel position detecting operation. If at least one part of the bottom of a vessel is placed on a dead zone between heating coils, the vessel may fail to occupy a critical percentage of the area of a heating coil, or may occupy only an area of the heating coil below a critical percentage as heating coil is determined as a heating coil that does not have a vessel placed thereon; that is, it is determined that a vessel is not placed on a cooking plate. Accordingly, the heating coil is not operated, and although a vessel is placed on a cooking plate, a cooking is not performed.

SUMMARY

Therefore, it is an aspect of the present disclosure to provide an induction heating cooker capable of minimizing the interference between a high frequency circuit part and a low frequency circuit part by changing the structure of a Printed Circuit Board (PCB) where an inverter circuit and a control circuit are installed.

It is an aspect of the present disclosure to provide an induction heating cooker capable of enhancing the assembly efficiency and the working efficiency when an inverter circuit is connected to a heating coil corresponding to the inverter circuit through wiring by changing the structure of a Printed Circuit Board (PCB) where an inverter circuit and a control circuit are installed.

It is an aspect of the present disclosure to provide an induction heating cooker capable of precisely detecting the position of a heating coil where a vessel is placed by changing the shape of the heating coil.

Additional aspects of the disclosure will be set forth in part in the description which follows and, in part, will be apparent from the description, or may be learned by practice of the disclosure.

In accordance with one aspect of the present disclosure, an induction heating cooker includes a cooking plate, a plurality of heating coils and a Printed Circuit Board (PCB). The cooking plate has a cooking vessel placed thereon. The plurality of heating coils is disposed while being adjacent to one other below the cooking plate. The Printed Circuit Board (PCB) has circuits, which are configured to drive the heating coils, placed thereon. The PCB is divided into a high frequency circuit part on which circuits characterized by high frequency are placed and a low frequency circuit part on which circuits characterized by low frequency are placed. The high frequency circuit part is spaced apart from the low frequency circuit part by a predetermined distance.

The high frequency circuit part may be disposed on a left edge of the PCB and on a right edge of the PCB, and the low frequency circuit part may be disposed between the high frequency circuit parts.

A heat radiation plate may be placed on the PCB to absorb heat generated from the circuit, characterized by high frequency, placed on the high frequency circuit part, and to dissipate heat to outside; and the high frequency circuit part is separated from the low frequency circuit part by the heat radiation plate.

The circuits configured to drive the heating coils may include a plurality of rectifier circuits, a plurality of inverter circuits and a plurality of subsidiary control circuits. The plurality of rectifier circuits is configured to perform rectification on an input alternating current (AC) power source to output a rectified ripple voltage. The plurality of inverter circuits is configured to supply a high frequency power source to the heating coils. The plurality of subsidiary control circuits is configured to control an operation of the heating coils.

The plurality of rectifier circuits and the plurality of inverter circuits may be placed on the high frequency circuit part of the PCB.

The plurality of subsidiary control circuits may be placed on the high frequency circuit part of the PCB.

The rectifier circuit may include a diode bridge.

The inverter circuit may include a switching device, which is configured to supply a resonance voltage to the heating coil according to a switching control signal of the subsidiary control circuit, and a resonance condenser which is connected in parallel to the heating coil and achieves a continuous resonance in cooperation with the heating coil by an input voltage, wherein the switching device includes an Insulted Gate Bipolar Transistor (IGBT).

A wire connecting part used to connect a wire may be installed on a left end portion or a right end portion of the PCB. The wire is configured to connect each of the heating coils to the corresponding circuit characterized by high frequency.

The heating coil may be provided in a shape of D that extends laterally.

A periphery of the heating coil may include a straight line portion and an arched line portion having a parabola shape.

The arched line portion having the parabola shape may be disposed facing a peripheral part of the cooking plate.

In accordance with another aspect of the present disclosure, an induction heating cooker includes a cooking plate, a plurality of heating coils, a plurality of detection parts and a control part. The cooking plate has a vessel placed thereon. The plurality of heating coils is disposed below the cooking plate while being adjacent to one another. The plurality of detection parts is configured to detect a value of electric current flowing through each of the heating coils. The control part is configured to detect a heating coil of the heating coils on which the vessel is placed, according to the value of electric current detected through the detection part. The heating coil is provided in a D shape that extends laterally.

A periphery of the heating coil may include a straight line portion and an arched portion having a parabola shape.

The arched portion having the parabola shape may be disposed facing a peripheral part of the cooking plate.

If a value of electric current flowing through the heating coil exceeds a critical value, the control part may determine the heating coil as a heating coil having the vessel placed thereon.

The critical value represents a value of electric current flowing through the heating coil when a vessel formed using magnetic material occupies a critical ratio of an area of the heating coil.

As described above, according to an embodiment of the present disclosure, the interference between a high frequency circuit part and a low frequency circuit part is minimized while enhancing the operation efficiency of each heating coil by changing the structure of a Printed Circuit Board (PCB) where an inverter circuit and a control circuit are installed.

In addition, according to another embodiment of the present disclosure, the assembly efficiency and the working efficiency are enhanced in wiring an inverter circuit to a heating coil corresponding to the inverter circuit through wiring by changing the structure of a printed circuit board (PCB) on which the inverter circuit and the control circuit are installed.

In addition, according to still another embodiment of the present disclosure, the position of a heating coil is precisely detected where a vessel is placed by changing the shape of the heating coil.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
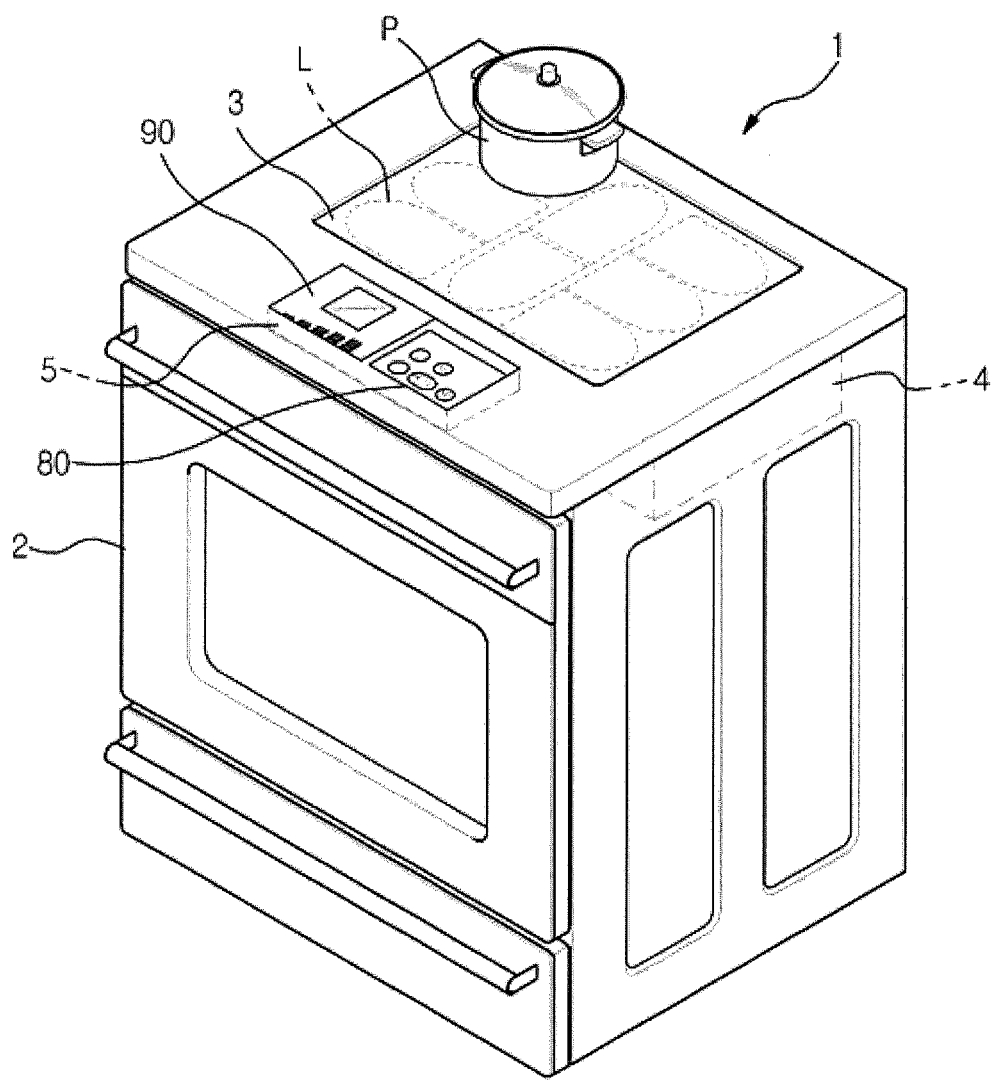
FIG. 1 is a perspective view illustrating the configuration of an induction heating cooker according to an embodiment of the present disclosure.

Reference will now be made in detail to the embodiments of the present disclosure, examples of which are illustrated in the accompanying drawings, wherein like reference numerals refer to like elements throughout.

FIG. 1 is a perspective view illustrating the configuration of an induction heating cooker according to an embodiment of the present disclosure.

Referring to FIG. 1, an induction heating cooker 1 includes a body 2.

A cooking plate 3 configured to place a vessel (P) is installed on the body 2.

A plurality of heating coils (L) is provided inside the body 2 below the cooking plate 3 to provide a heat source. The heating coils (L) are densely disposed while being adjacent to one another over the entire surface of the cooking plate 3. As an example, the description of the heating coils (L) will be described in relation that the heating coils (L) include eight heating coils (L) disposed on the induction heating cooker 1.

In addition, a control apparatus 4 is provided below the cooking plate 3 to drive the heating coils (L). A circuit configuration of the control apparatus 4 will be described later with reference to FIG. 3.

In addition, a control panel 5 which includes an operation part 80 and a display part 90 is provided on the body 2. The operation part 80 includes a plurality of operation buttons which are used to input a corresponding command to the control apparatus 4 to drive the heating coils (L). The display part 90 displays information about the operation of the induction heating cooker 1.

Figure 2:
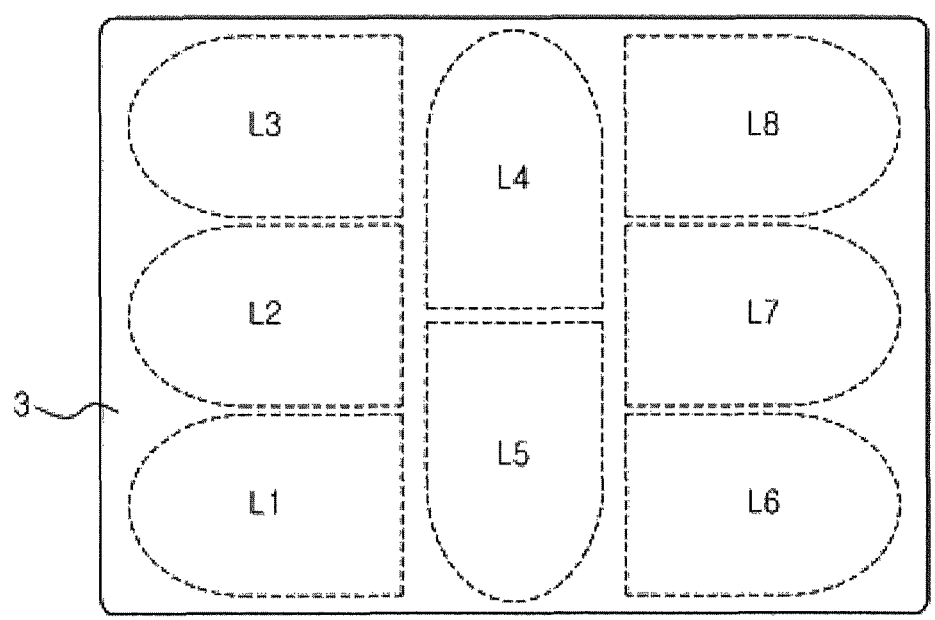
FIG. 2 is a view illustrating the disposition structure of heating coils provided on the induction heating cooker according to the embodiment of the present disclosure.

FIG. 2 is a view illustrating the disposition structure of heating coils which is provided on the induction heating cooker according to the embodiment of the present disclosure.

Referring to FIG. 2, eight heating coils L1 to L8 are disposed below the cooking plate 3 of the induction heating cooker 1. Each of the heating coils L1 to L8 is provided in a D shape and extends laterally. That is, each of the heating coils L1 to L8 is provided in a shape of a parabola having a large height and a straight line connecting end points of the parabola. Accordingly, the periphery of each of the heating coils L1 to L8 includes a straight line portion and an arched line portion (curved line portion) having a parabola.

Referring to FIG. 2, the eight heating coils L1 to L8 form three columns including a first column, a second column, and a third column. In disposing the heating coils L1 to L8, three heating coils L1 to L3 are disposed on the first column such that the curved line portion of each of the heating coils L1 to L3 faces a left edge of the cooking plate 3. Two heating coils L4 and L5 are disposed on the second column such that the curved line portion of each of the heating coils L4 and L5 faces an upper edge or a lower edge of the cooking plate 3. Three heating coils L6 to L8 are disposed on the third column such that the curved line portion of each of the heating coils L6 to L8 faces a right edge of the cooking plate 3. That is, the curved line portion of each of the heating coil L1 to L8 is disposed to face the peripheral part of the cooking plate 3. Such a disposition structure of the heating coils L1 to L8 reduces a dead zone among the heating coils L1 to L8. The shape of the heating coils L1 to L8 will be described in detail later with reference to FIGS. 6 to 10.

Figure 3:
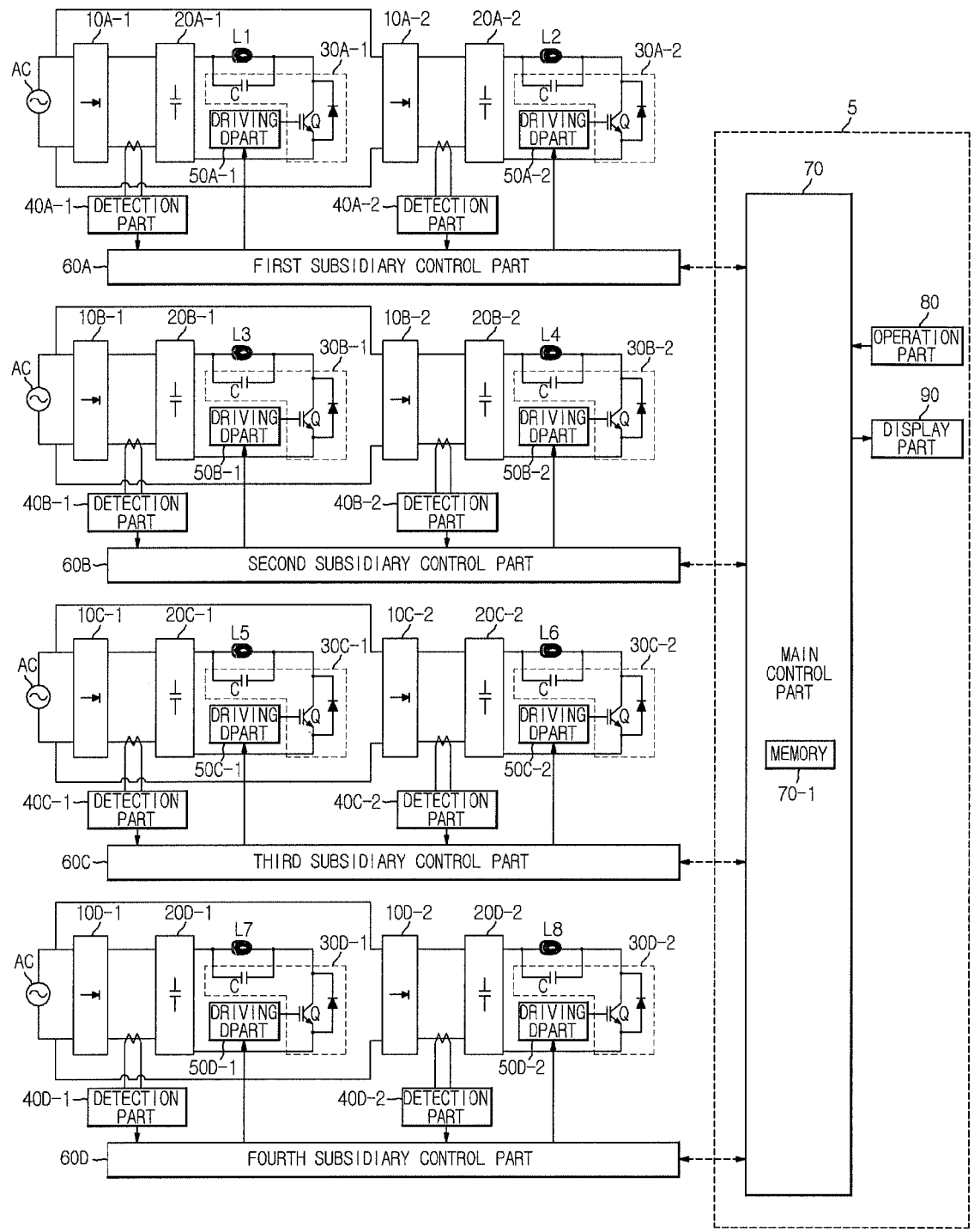
FIG. 3 is a block diagram showing the operation of the induction heating cooker according to the embodiment of the present disclosure.

FIG. 3 is a block diagram showing the operation of the induction heating cooker according to the embodiment of the present disclosure.

Referring to FIG. 3, the control part 4 of the induction heating cooker 1, according to the embodiment of the present disclosure, includes four subsidiary control parts which include a first subsidiary control part 60A, a second subsidiary control part 60B, a third subsidiary control part 60C, and a fourth subsidiary control part 60D. The control panel 5 includes a main control part 70, the operation part 80, and the display part 90.

Each of the subsidiary control parts 60A, 60B, 60C, and 60D is configured to control the operation of two heating coils, which are grouped as a unit for control, among the heating coils L1 to L8. The main control part 70 is configured to the four subsidiary control parts 60A, 60B, 60C, and 60D.

As an example, the description of the heating coils L1 to L3 and the subsidiary control parts 60A, 60B, 60C, and 60D will be explained in relation that, among the heating coils L1 to L3, each of the subsidiary control parts 60A, 60B, 60C, and 60D is provided for two heating coils being adjacent to each other in the disposition structure of the heating coils (L) shown in FIG. 2. That is, the first subsidiary control part 60A controls the operation of two heating coils L1 and L2 disposed on a lower side of the first column while being adjacent to each other in the disposition structure consisting of the three columns. The second subsidiary control part 60B controls the operation of two heating coils L3 and L4 disposed on a upper side of the first column and on a upper side of the second column, respectively, while being adjacent to each other in the disposition structure consisting of the three columns. The third subsidiary control part 60C controls the operation of two heating coils L5 and L6 disposed on a lower side of the second column and on a lower side of the third column, respectively, while being adjacent to each other in the disposition structure consisting of the three columns. The fourth subsidiary control part 60D controls the operation of two heating coils L7 and L8 disposed on an upper side of the third column while being adjacent to each other in the disposition structure consisting of the three columns.

Since the configuration of control components to operate each two adjacent heating coils (L1, L2), (L3, L4), (L5, L6) and (L7 and L8) is the same, detailed descriptions will be made in relation to control components used to operate the heating coils L1 and L2 disposed on the lower side of the first column while being adjacent to each other, and details of control components for other heating coils L3 to L8 will be omitted.

Referring to FIG. 3, the control components of the control apparatus 4 used to operate the heating coils L1 and L2 include rectifier parts 10A-1 and 10A-2, smoothing parts 20A-1 and 20A-2, inverter parts 30A-1 and 30A-2, detection parts 40A-1 and 40A-2, driving parts 50A-1 and 50A-2, and the first subsidiary control part 60A.

The heating coils L1 and L2 are operated by the inverter parts 30A-1 and 30A-2, respectively, which are provided in a predetermined number corresponding to the number of the heating coils L2 and L2, independent of each other. That is, the heating coils L1 is operated by the inverter part 30A-1, and the heating coils L2 is operated by the inverter part 30A-2.

The rectifier parts 10A-1 and 10A-2 are configured to perform rectification on an input alternating current (AC) power source to output a ripple voltage of a waveform, which is produced through the rectification. Each of the rectifier parts 10A-1 and 10A-2 may be implemented using a diode bridge.

The smoothing parts 20A-1 and 20A-2 are configured to smooth the ripple voltage provided from the rectifier parts 10A-1 and 10A-2 to output a constant Direct Current voltage.

Each of the inverter parts 30A-1 and 30A-2 includes a switching device (Q) and a resonant condenser (C). The switching device receives a direct current voltage from a respective smoothing part of the smoothing parts 20A-1 and 20A-2 and provides a resonant voltage to a respective heating coil of the heating coils L1 and L2 according to a switching control signal of a respective driving part of the driving parts 50A-1 and 50A-2. The resonant condenser (C) is connected in parallel to a respective heating coil of the heating coils L1 and L2 to achieve a continuous resonance in cooperation with a respective heating coil of the heating coils L1 and L2. The switching device (Q) may be implemented using an Insulated Gate Bipolar Transistor (IGBT).

If the switching devices (Q) of the inverter parts 30A-1 and 30A-2 are conducting, the resonance condensers (C) form parallel resonance circuits in cooperation with a respective heating coil of the heating coil L1 and the heating coil L2. If the switching devices (Q) are non-conducting, charges stored in the resonance condensers (C) during the conducting of the switching devices (Q) are discharged and an electric current flows in a reverse direction to a high frequency electric current that flows when the switching devices (Q) are conducting.

The detection parts 40A-1 and 40A-2 are provided on a line between the rectifier part 10A-1 and the smoothing part 20A-1 and a line between the rectifier part 10A-2 and the smoothing part 20A-2, respectively. The detection parts 40A-1 and 40A-2 are configured to detect a value of electric current flowing through each of the heating coils L1 and L2 to detect a heating coil on which a vessel (P) is placed, and provides the detected value of electric current to the first subsidiary control part 60A. The detection parts 40A-1 and 40A-2 are provided in a predetermined number corresponding to the number of the heating coils L1 and L2, and may be implemented using a current transformer sensor or a current sensor. Although the detection parts 40A-1 and 40A-2 according to this embodiment of the present disclosure are implemented using a current transformer, the present disclosure is not limited thereto. The detection part may be provided in various sensors including a voltage sensor, a pressure sensor, an infrared sensor, etc. to detect a heating coil on which a vessel (P) is placed.

The driving parts 50A-1 and 50A-2 are configured to output a driving signal to the switching devices (Q) of the inverter parts 30A-1 and 30A-2 according to a control signal of the first subsidiary part 60A such that the switching devices (Q) is switched on or off.

The first subsidiary control part 60A transmits a control signal to the driving parts 50A and 50A-2 according to a control signal of the main control part 70 such that the operation of each of the heating coils L1 and L2 is controlled. In addition, the first subsidiary control part 60A sends the main control part 70 a value of electric current flowing through each of the heating coil L1 and L2, the value detected through the detecting parts 40A-1 and 40A-2.

The main control part 70 represents a main microcomputer provided inside the control panel 5 and is configured to control the overall operation of the induction heating cooker 1. The main control part 70 is connected, as to enable communication, to the first to fourth subsidiary control parts 60A, 60B, 60C, and 60D, which control the corresponding two coils adjacent to each other in the disposition structure of the heating coils (L) having three columns. The main control part 70 transmits a control signal to the respective subsidiary control parts 60A, 60B, 60C, and 60D to control the operation of the heating coils L1 and L2, the heating coils L3 and L4, the heating coils L5 and L6, and the heating coils L7 and L8.

By use of a value of electric current flowing through each of the heating coils (L), the value detected through the detection parts 40A-1 and 40A-2, 40B-1 and 40B-2, 40C-1 and 40C-2, and 40D-1 and 40D-2, the main part 70 detects a heating coil (L) on which a vessel (P) is placed while controlling the operation of the inverter parts 30A-1 and 30A-2, 30B-1 and 30B-2, 30C-1 and 30C-2, and 30D-1 and 30D-2 such that a high frequency power is supplied to each of the heating coils (L) according to a command for detecting the position of a vessel (P), the command input through the operation part 80.

The main control part 70 controls the operation of the inverter parts 30A-1 and 30A-2, 30B-1 and 30B-2, 30C-1 and 30C-2, and 30D-1 and 30D-2 to supply a heating coil (L), which is determined to have a vessel (P) placed thereon, with a high frequency power of a level that is input through the operation part 80 and to perform the cooking operation.

The main control part 70 includes a memory 70-1. The memory 70-1 stores a critical value (a critical level of percentage, for example) used to determine whether a vessel (P) is placed on the heating coil (L).

The operation part 80 includes various buttons including an ON/OFF button to turn on/off power, an AUTO button to input a command to detect the position of a vessel, an adjustment (+/−) button to adjust a power level of the heating coil (L), and a START/PAUSE button to instruct a start or a pause of the cooking operation.

The display part 90 displays position information about the heating coil (L) on which a vessel (P) is placed, and the power level of the heating coil (L) which is input by a user through the adjustment (+/−) button.

According to the embodiment of the present disclosure, each of the subsidiary control parts 60A, 60B, 60C, and 60D is disposed for each two heating coils disposed adjacent to each other in the disposition structure of the heating coils (L) consisting of the three columns, and the subsidiary control parts 60A, 60B, 60C, and 60D are controlled by a single main control part 70, but the present disclosure is not limited thereto. Alternatively, the subsidiary control part may be implemented in a different configuration. Alternatively, the eight coils may be controlled by one control part without adopting a subsidiary control part.

Hereinafter, referring to FIGS. 4 and 5, the design of a Printed Circuit Board (PCB) provided on the induction heating cooker according to the embodiment of the present disclosure and the coupling structure between the PCB and the heating coil will be described.

Since the induction heating cooker 1 having small heating coils (L) densely disposed under the entire surface of the cooking plate 3 requires a number of inverter circuits to be installed on the PCB having a limited area, the configuration of circuits of the PCB is very complicated. Accordingly, interference occurs between a high frequency circuit part and a low frequency circuit part on the PCB, causing a control signal to be distorted.

According to this embodiment of the present disclosure, various circuits used to drive the heating coils (L) of the induction heating cooker 1 are divided into a high voltage/high frequency circuit and a low voltage/low frequency circuit such that the high voltage/high frequency circuit and the low voltage/low frequency circuit are disposed on a high frequency circuit part and a low frequency circuit part, respectively, on the PCB, thereby preventing a control signal waveform from being distorted that may be caused by interference between the high frequency circuit part and the low frequency circuit part.

Figure 4:
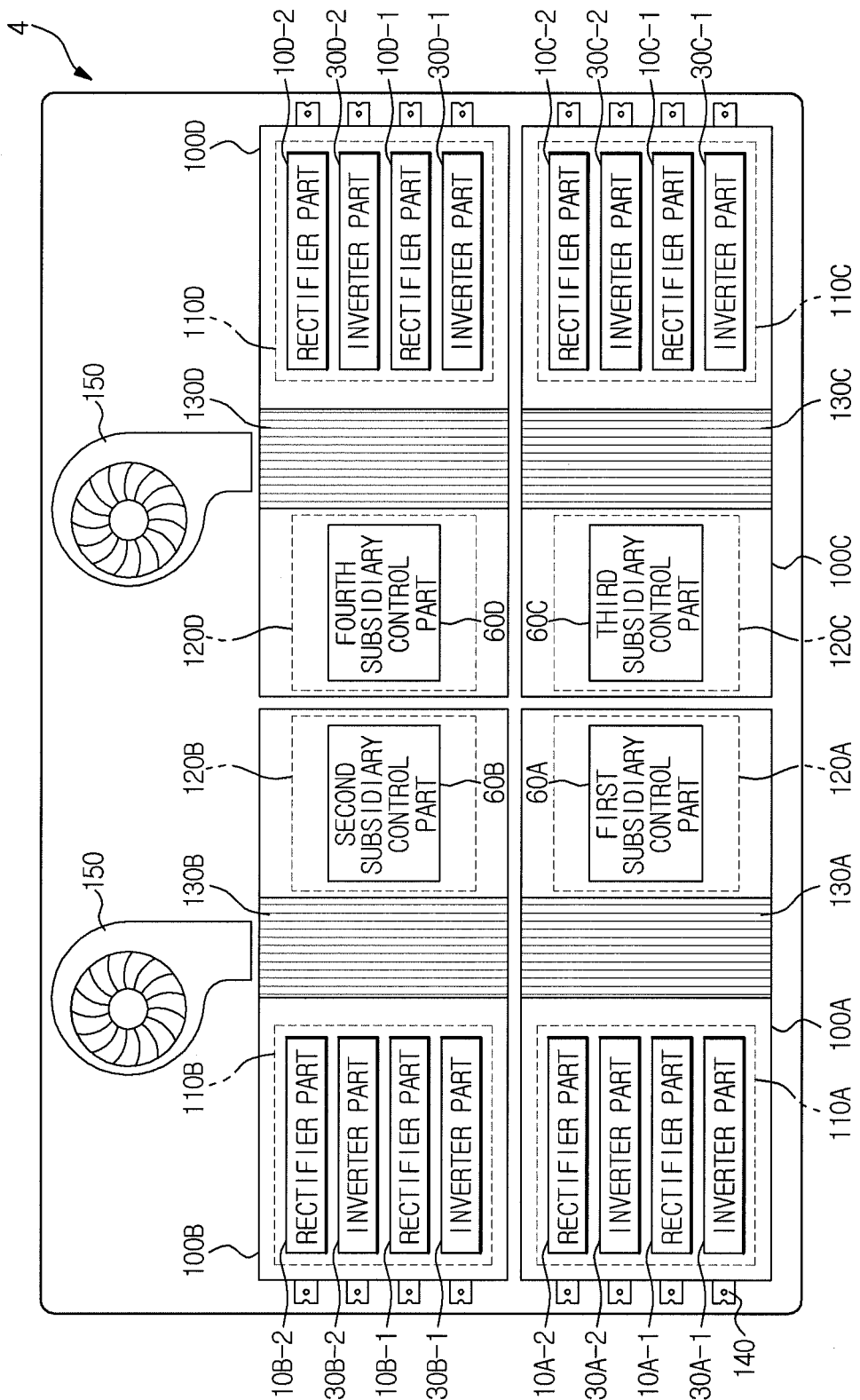
FIG. 4 is a view illustrating the design of a printed circuit board (PCB) provided on a control apparatus of the induction heating cooker according to the embodiment of the present disclosure.

FIG. 4 is a view illustrating the design of the PCB provided on the control apparatus of the induction heating cooker according to the embodiment of the present disclosure.

Referring to FIG. 4, the control apparatus 4 of the induction heating cooker 1 includes a first printed circuit board (PCB) 100A, a second printed circuit board (PCB) 100B, a third printed circuit board (PCB) 100C and a fourth printed circuit board (PCB) 100D and two heat radiation fans 150. Each of the PCBs 100A, 100B, 100C and 100D is provided to place circuits for two heating coils (L), which are grouped in a unit for controlling among the eight heating coils (L) disposed under the cooking plate 3.

As an example, the description of the PCBs 100A, 100B, 100C, and 100D will be described in relation that each of the PCBs 100A, 100B, 100C, and 100D is provided for two heating coils, which are being adjacent to each other in the disposition structure of the heating coils shown in FIG. 2, among the heating coils L1 to L3. That is, the first PCB 100A has circuits used to operate the two heating coils L1 and L2 disposed on the lower side of the first column while being adjacent to each other in the disposition structure of the heating coils shown in FIG. 2. The second PCB 100B has circuits used to operate the two heating coils L3 and L4, which are disposed on the upper side of the first column and on the upper side of the second column, respectively, while being adjacent to each other in the disposition structure of the heating coils shown in FIG. 2. The third PCB 100C has circuits that are used to operate the two heating coils L5 and L6, which are disposed on the lower side of the second column and on the lower side of the third column, respectively, while being adjacent to each other in the disposition structure of the heating coils shown in FIG. 2. The fourth PCB 100D has circuits that are used to operate the two heating coils L7 and L8, which are disposed on the upper side of the third column while being adjacent to each other in the disposition structure of the heating coils shown in FIG. 2. The first PCB 100A is disposed on a left lower portion of the control apparatus 4, the second PCB 100b is disposed on a left upper portion of the control apparatus 4, the third PCB 100C is disposed on a right lower portion of the control apparatus 4, and the fourth PCB 100D is disposed on a right upper portion of the control apparatus 4. Accordingly, the first PCB 100A and the third PCB 100C are disposed in a left and right disposition on the control apparatus 4, the second PCB 100B and the fourth PCB 100D are disposed in a left and right disposition on the control apparatus 4, the first PCB 100A and the second PCB 100B are disposed in a upper and lower disposition on the control apparatus 4, and the third PCB 100C and the fourth PCB 100D are disposed in an upper and lower disposition on the control apparatus 4.

As shown in FIG. 4, since the first PCB 100A has the same design structure as that of the second PCB 100B, and the third PCB 100C has the same design structure as that of the fourth PCB 100D, detailed description will be made on the first PCB 100A and the third PCB 100C while details of the second PCB 100B and the fourth PCB 100D will be omitted.

As shown in a lower left portion of FIG. 4, the first PCB 100A includes a first high frequency circuit part 110A, a first low frequency circuit part 120A, a first heat radiation plate 130A, and four wire connecting parts 140.

As shown in a lower right portion of FIG. 4, the third PCB 100C includes a third high frequency circuit part 110C, a third low frequency circuit part 120C, a third heat radiation plate 130C, and four wire connecting parts 140.

As shown in FIG. 4, for the first PCB 100A, the first heat radiation plate 130A is disposed in the middle of the first PCB 100A, the first high frequency circuit part 110A and the first low frequency circuit part 120A are disposed on the left side and the right side of the first heat radiation plate 130A, and the wire connecting parts 140 are connected to a left end portion of the first PCB 100A. Different from the first PCB 100A, for the third PCB 100C, the third heat radiation plate 130C is disposed in the middle of the third PCB 100C, the third low frequency circuit part 120C and the third high frequency circuit part 110C are disposed on the left side and the right side of the third heat radiation plate 130C, and the wire connecting parts 140 are connected to a right end portion of the third PCB 100C.

The high frequency circuit part 110A and 110C represent areas that have high voltage/high frequency circuits on the PCBs 100A and 100C. Referring to FIG. 3, the inverter parts 30A-1, 30A-2, 30C-1, and 30C-2 correspond to the high voltage/high frequency circuits.

The low frequency circuit parts 120A and 120C represent areas that have low voltage/low frequency circuits on the PCBs 100A and 100C. Referring to FIG. 3, the subsidiary control parts 60A, 60B, 60C, and 60D each configured to operate two adjacent heating coils of the heating coils L1 to L8 correspond to the low voltage/low frequency circuits.

The heat radiation plates 130A and 130C are configured to absorb heat generated from an IGBT device that serves as the switching device (Q) of the inverter parts 30A-1, 30A-2, 30C-1, and 30C-2 and from a diode bridge device serving as the rectifier parts 10A-1, 10A-2, 10C-1, and 10C-2, and also are configured to dissipate the heat to outside. The heat radiation plates 130A and 130C are disposed in the middle portions of the PCBs 100A and 100C, respectively. The high voltage/high frequency circuits are laterally separated from the low voltage/low frequency circuits while interposing the heat radiation plates 130A and 130C.

The wire connecting part 140 is configure to connect a wire, which is withdrawn from a heating coil (L), to the PCBs 100A and 100C such that the heating coil (L) is connected to an inverter circuit corresponding to the heating coil (L). The first PCB 100A is provided at the left end portion thereof with the four wire connecting parts 140, and the third PCB 100B is provided at the right end portion thereof with the four wire connecting parts 140.

According to this example, the control part 4 of the induction heating cooker 1 further include the heat radiation fans 150.

The heat radiation fan 150 is powered by an actuator, such as an electric motor, produces an airflow, and forces the airflow to have convection toward the heat radiation plates 130A, 130B, 130C, and 130D, so that heat is transferred to the heat radiation plates 130A, 130B, 130C, and 130D and is radiated to the outdoor air.

According to this embodiment of the present disclosure, each of the PCBs 100A, 100B, 100C, and 100D is provided for in adjacent to each of the two heating coils in the disposition structure of the heating coils consisting of the three columns According to the embodiment of the present disclosure, each of the PCBs 100A, 100B, 100C and 100D is provided for each of the two heating coils that are disposed adjacent to each other in the disposition structure of the eight heating coils (L) consisting of the three columns, but the present disclosure is not limited thereto. Alternatively, the PCB may be provided in variety of numbers or shapes. Alternatively, all the circuits used to operate the eight heating coils (L) may be placed on a single PCB.

Figure 5A:
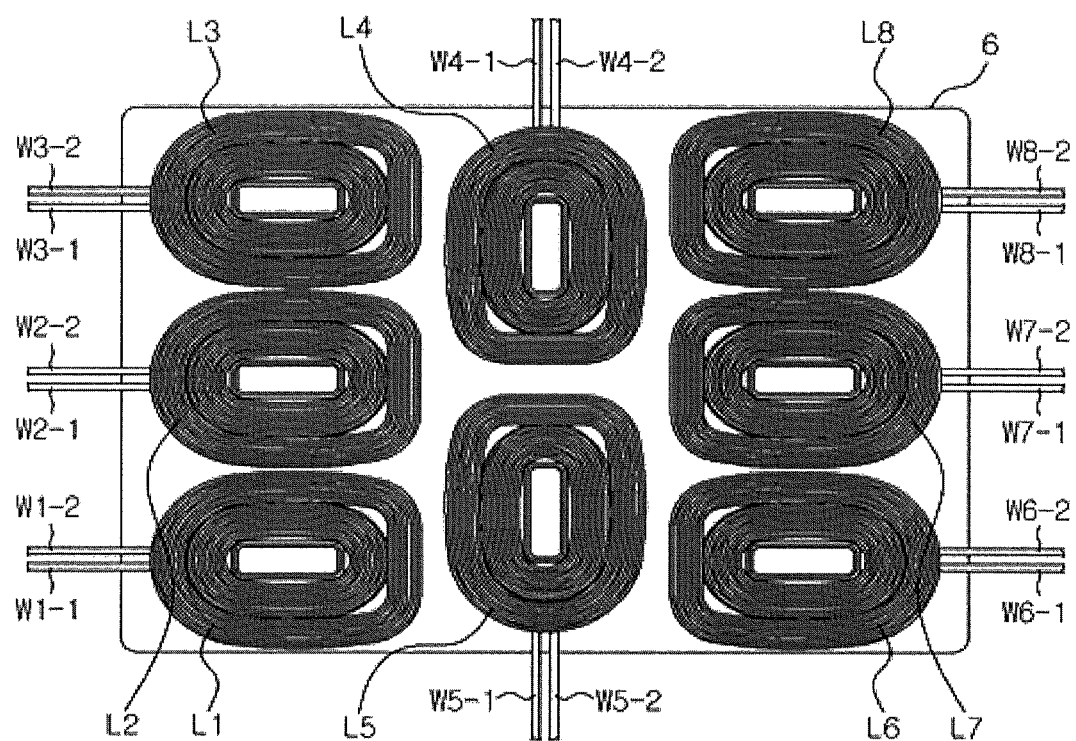
FIGS. 5A and 5B illustrating a coupling structure of a heating coil and a printed circuit board (PCB) that is provided on a control apparatus of the induction heating cooker according to the embodiment of the present disclosure.
Figure 5B:
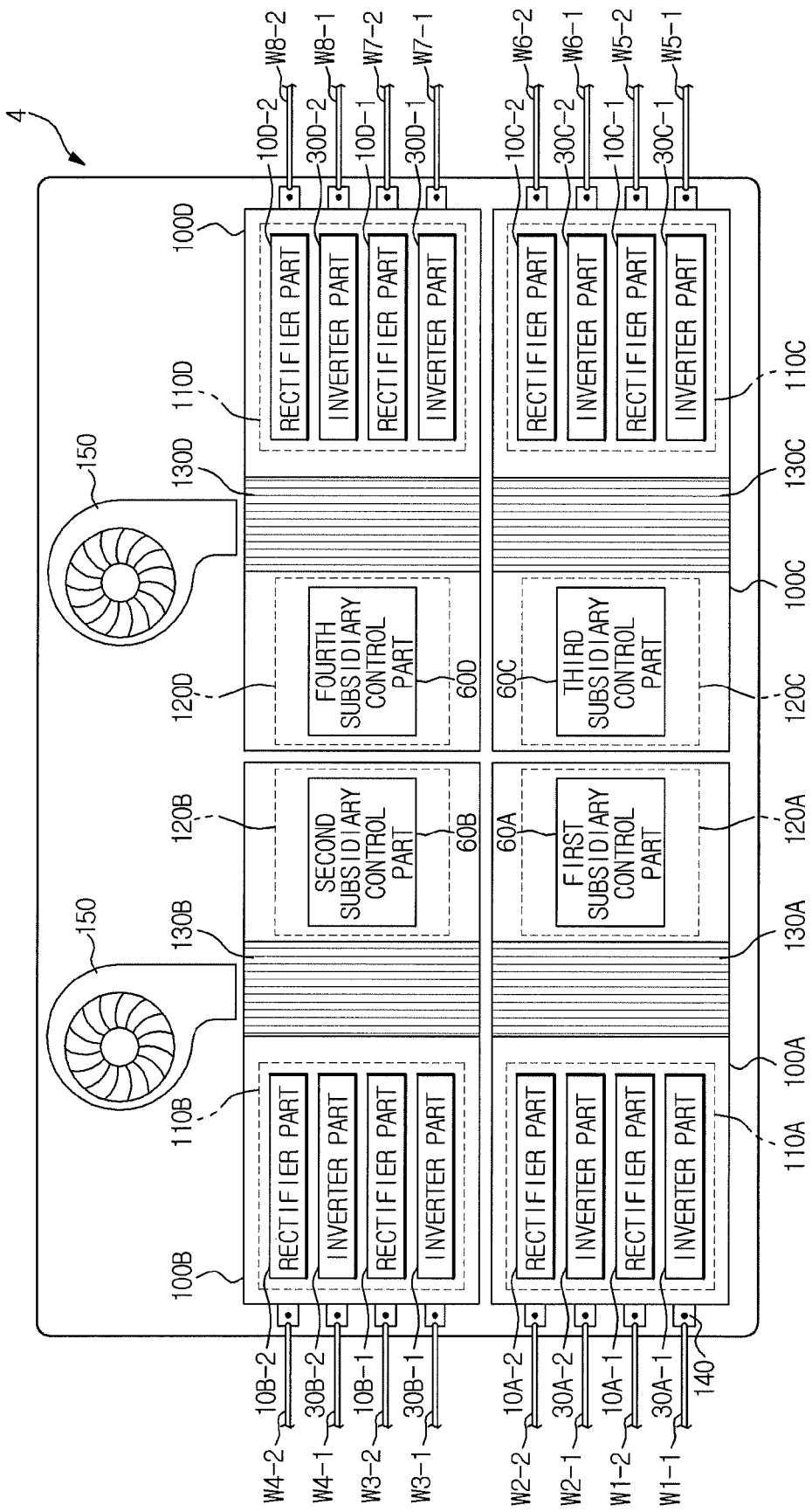

FIGS. 5A and 5B illustrating a coupling structure of a heating coil and a printed circuit board (PCB) that is provided on a control apparatus of the induction heating cooker according to the embodiment of the present disclosure.

Referring to FIGS. 5A and 5B, the eight heating coils L1 to L8 are attached to a support plate 6 in the disposition structure consisting of the three columns. The support plate 6 having the eight heating coils L1 to L8 is installed on a lower side of the cooking plate 3.

Referring to FIGS. 5A and 5B, wires W1-1, W1-2, W2-1, W2-2, W3-1, W3-2, W4-1, W4-2, W5-1, W5-2, W6-1, W6-2, W7-1, W7-2, W8-1, and W8-2 configured to connect the heating coils L1 to L8 to the inverter circuits are withdrawn from the heating coils L1 to L8. Two wires are withdrawn from each of the heating coils L1 to L8. The two wires W1-1 and W1-2 withdrawn from the heating coil L1 are connected to the wire connecting parts 140 that are provided on the first PCB 100A on which the inverter circuit 30A-1 corresponding to the two wires W1-1 and W1-2 is placed through a connecting member such as a screw. Similarly, the two wires W2-1 and W2-2 withdrawn from the heating coil L2 are connected to the wire connecting parts 140 that are provided on the first PCB 100A on which the inverter circuit 30A-2 corresponding to the two wires W2-1 and W2-2 is placed through a connecting member such as a screw. The two wires W3-1 and W3-2 withdrawn from the heating coil L3 are connected to the wire connecting parts 140 that are provided on the second PCB 100B on which the inverter circuit 30B-1 corresponding to the two wires W3-1 and W3-2 is placed through a connecting member such as a screw. The two wires W4-1 and W4-2 withdrawn from the heating coil L4 are connected to the wire connecting parts 140 that are provided on the second PCB 100B on which the inverter circuit 30B-2 corresponding to the two wires W4-1 and W4-2 is placed through a connecting member such as a screw. The two wires W5-1 and W5-2 withdrawn from the heating coil L5 are connected to the wire connecting parts 140 that are provided on the third PCB 100C on which the inverter circuit 30C-1 corresponding to the two wires W5-1 and W5-2 is placed through a connecting member such as a screw. The two wires W6-1 and W6-2 withdrawn from the heating coil L6 are connected to the wire connecting parts 140 that are provided on the third PCB 100C on which the inverter circuit 30C-2 corresponding to the two wires W6-1 and W6-2 is placed through a connecting member such as a screw. The two wires W7-1 and W7-2 withdrawn from the heating coil L7 are connected to the wire connecting parts 140 that are provided on the fourth PCB 100D on which the inverter circuit 30D-1 corresponding to the two wires W7-1 and W7-2 is placed through a connecting member such as a screw. The two wires W8-1 and W8-2 withdrawn from the heating coil L8 are connected to the wire connecting parts 140 that are provided on the fourth PCB 100D on which the inverter circuit 30D-2 corresponding to the two wires W8-1 and W8-2 is placed through a connecting member such as a screw.

As described above, the convention induction heating cooker has a connection structure in which a wire withdrawn from an inverter circuit is connected to a heating coil corresponding to the inverter circuit, thereby degrading assembly efficiency and working efficiency in connecting each inverter circuit to the heating coil corresponding to the each inverter circuit.

However, according to the embodiment of the present disclosure, the wires W1-1 to W8-2 used to connect the heating coil (L) and the inverter circuit corresponding to the heating coil (L) are withdrawn from the heating coil (L), and the wire connecting parts 140 are provided at the end portions of the both PCBs 100A to 100D, thereby improving assembly efficiency and work efficiency in wiring each inverter circuit 30A-1 to 30D-2 to the heating coils L1 to L8 corresponding to the each inverter circuit 30A-1 to 30D-2.

For the induction heating cooker 1 having small heating coils (L) densely disposed under the entire surface of the cooking plate 3, if a vessel (P) on a heating coil (L) occupies a critical percentage of an area of the heating coil (L), that is, the occupancy ratio of a vessel (P) on a heating coil (L) (hereinafter, referred to as a vessel occupancy ratio) exceeds a critical percent of the area of the heating coil (L), the heating coil (L) is determined as a heating coil having a vessel (P) placed thereon and is operated for cooking food. Meanwhile, if a vessel (P) is not placed on a heating coil (L), or even if a vessel (P) is placed on a heating coil (L) if the vessel (L) occupies an area of the heating coil (L) below a critical percentage, the heating coil (L) is determined as a heating coil which does not have a vessel (P) placed thereon and thus the heating coil (L) is not operated.

The vessel occupancy ratio of a vessel (P) is determined by use of a value of electric current flowing through each of the heating coils (L). That is, in order to detect a heating coil (L) having a vessel (P) placed thereon, a value of electric current flowing through each of the heating coils (L) is detected, and it is determined that the heating coil (L) is a heating coil having the vessel (P) placed thereon if the detected value of electric current exceeds a critical value. The critical value is a reference value used to determine whether a vessel (P) is placed on a heating coil (L). For example, the critical value is determined as a value of electric current flowing through a heating coil (L) when a vessel (P) formed using magnetic material such as iron (Fe) occupies more than 40% of the area of the heating coil (L). The critical value is set to be greater than a value of electric current flowing through the heating coil (L) when a vessel (P) formed using non-magnetic material such as aluminum (Al) occupies over 40% of the area of the heating coil (L). If a value of electric current flowing through a heating coil (L) exceeds a preset critical value, that is, a vessel (P) occupies over 40% of the area of a heating coil (L), the heating coil (L) is determined as a heating coil having a vessel placed thereon and is operated for cooking food. If a value of electric current flowing through a heating coil (L) is below a preset critical value, that is, a vessel (P) occupies less than 40% of the area of a heating coil (L), the heating coil (L)

is determined as a heating coil that has a vessel placed thereon, and is not operated for cooking food.

If a plurality of heating coils (L) having a circular shape (or an elliptical shape) are densely disposed over the entire surface of the cooking plate 3, a dead zone is formed between the heating coils (L). In this case, even if a vessel (P) is placed on a heating coil (L), the vessel occupancy ratio is lowered due to the dead zone, so that the heating coil (L) is determined as a heating coil that does not have a vessel placed thereon and an appropriated cooking operation is not performed.

In this regard, the shape of a conventional heating coil (L) having a circular shape or an elliptical shape is changed to reduce the dead zone between the heating coils (L), thereby more precisely detecting the position of a heating coil (L) having a vessel (P) placed thereon.

Hereinafter, the shape of a heating coil provided in the induction heating cooker according to an embodiment of the present disclosure will be described in detail.

Figure 6:
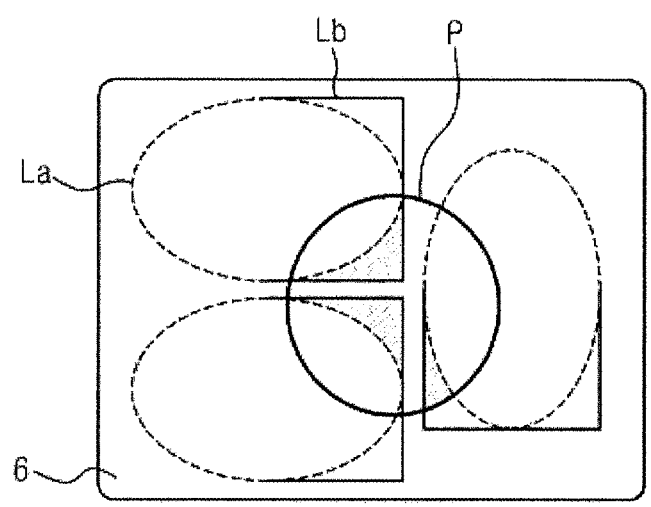
FIG. 6 is a view used to explain the difference of the vessel occupancy ratio for the heating coil that is provided on the induction heating cooker according to the embodiment of the present disclosure and an elliptical heating coil.

FIG. 6 is a view used to explain the difference of the vessel occupancy ratio for the heating coil provided on the induction heating cooker according to the embodiment of the present disclosure and an elliptical heating coil.

Referring to FIG. 6, a heating coil (Lb) provided in the induction heating cooker according to the embodiment of the present disclosure is provided in a D shape and extends laterally. That is, a periphery of the heating coil includes a straight line portion and an arched line portion having a parabola shape.

Referring to FIG. 6, the disposing of the heating coils (Lb) on the support plate 6, according to the embodiment of the present disclosure, forms less of a dead zone than disposing the conventional heating coils (La) having an elliptical shape. That is, the disposing of the heating coils (Lb) according to the embodiment of the present disclosure reduces an area of the dead zone corresponding to the shaded portion shown in FIG. 6. If the dead zone is reduced, the vessel occupancy ration is increased, thereby lowering the possibility of failing to perform cooking operation due to the position of the vessel even when a user cooks by use of a small vessel, that is, a vessel having a small bottom size.

In this case, the disposition structure of the heating coils (Lb) is designed such that the curved line portion of the heating coil (Lb) is disposed facing a peripheral part of the cooking plate 3 or the support plate 6.

Figure 7:
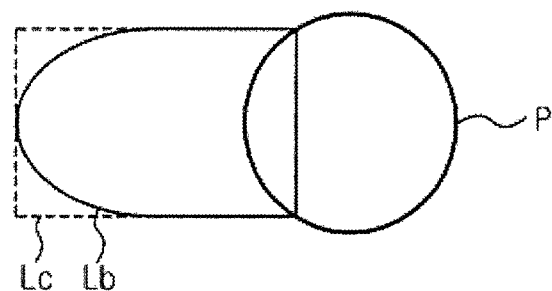
FIG. 7 is a view used to explain the difference of the vessel occupancy ratio for the heating coil that is provided on the induction heating cooker according to the embodiment of the present disclosure and a rectangular heating coil.

FIG. 7 is a view used to explain the difference of the vessel occupancy ratio for the heating coil provided on the induction heating cooker according to the embodiment of the present disclosure and a rectangular heating coil.

A heating coil (L) having a rectangular shape provides a benefit to densely install the heating coil (L) on the entire surface of the cooking plate 3.

In general, the vessel occupancy ratio of a vessel (P) for a heating coil (L) is calculated as equation 1 shown below.

The vessel occupancy ratio of a vessel (P) for a heating coil (L)=occupancy area of a vessel (P) on a heating coil (L)/the entire area of a heating coil (L)   [Equation 1]

Referring to FIG. 7, with respect to the entire area of a heating coil, since rectangular heating coil (Lc) has an entire area larger than that of a heating coil (Lb) according to the embodiment of the present disclosure, the vessel occupancy ratio of a vessel for the heating coil (Lb) is greater than that of a vessel for the rectangular heating coil (Lc) in the case that the vessel occupies the same area for the rectangular heating coil (Lc) and the heating coil (Lb).

That is, if a rectangular heating coil (Lc) is used, the dead zone between the rectangular heating coils (Lc) is reduced but the entire area of each rectangular heating coil (Lc) is increased, thereby producing a vessel occupancy ratio that may be the same as or lower than that produced when a heating coil (Lb) according to the embodiment of the present disclosure is used. According to the embodiment of the present disclosure, since a heating coil (Lb) is provided in a shape including a parabola having a large height and a straight line connecting end points of the parabola, the dead zone between heating coils is reduced and the vessel occupancy ratio for the heating coil is increased, so that the position of a heating coil on which a vessel (P) is more precisely placed, thereby preventing from failing to perform a cooking operation when a vessel (P) is placed on a heating coil.

Figure 8:
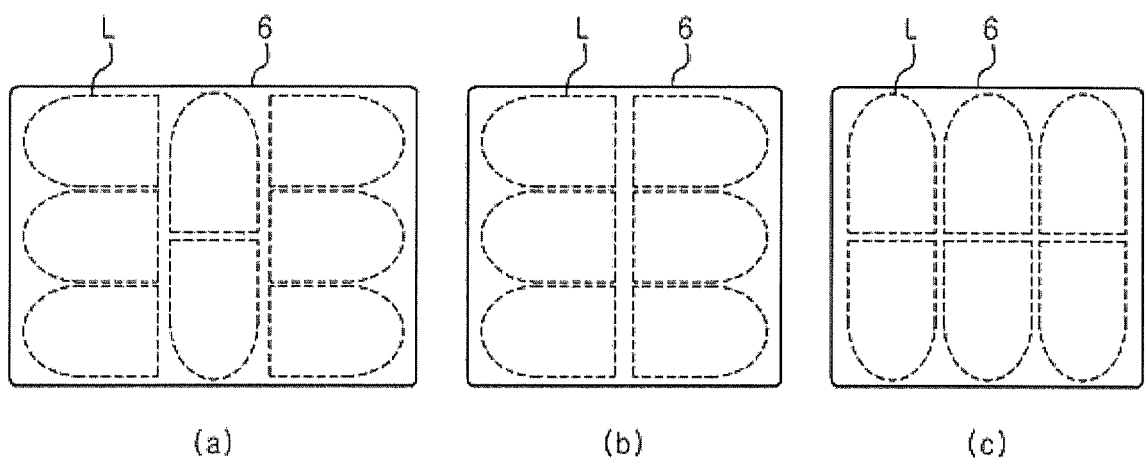
FIG. 8 is a view illustrating the variety of disposition structures of the heating coils that is provided on the induction heating cooker according to the embodiment of the present disclosure.

FIG. 8 is a view illustrating the variety of disposition structures of the heating coils provided on the induction heating cooker according to the embodiment of the present disclosure.

Referring to drawing (a) in FIG. 8, heating coils (L) may have a disposition structure consisting of three columns, referring to drawing (b) in FIG. 8, heating coils (L) may have a disposition structure of a 3×2 matrix, and referring to drawing (c) in FIG. 8, heating coils (L) may have a disposition structure a 2×3 matrix. The disposition structure is designed such that the curved line portion of the heating coil (L) faces a peripheral part of the cooking plate 3 or the support plate 6.

Figure 9:
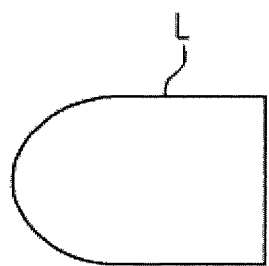
FIG. 9 is a view illustrating the variety of designs of the heating coil that is provided on the induction heating cooker according to the embodiment of the present disclosure.
Figure 9:
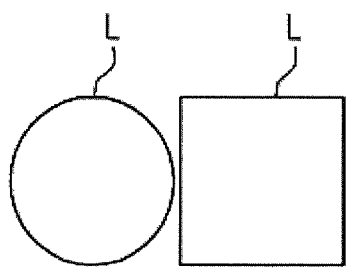
Figure 9:
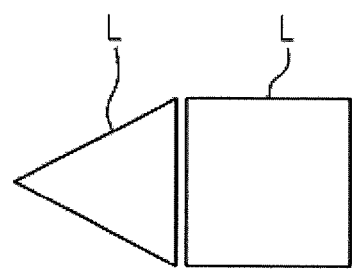

FIG. 9 is a view illustrating the variety of designs of the heating coil provided on the induction heating cooker according to the embodiment of the present disclosure.

Referring to a drawing (a) of FIG. 9, the heating coil (L) may be provided as an integral body. Alternatively, referring to a drawing (b) of FIG. 9, the heating coil (L) may be provided in the combination of a circular heating coil and a rectangular heating coil. Alternatively, referring to a drawing (c) of FIG. 9, the heating coil (L) may be provided in the combination of a circular heating coil and a triangular heating coil.

Figure 10:
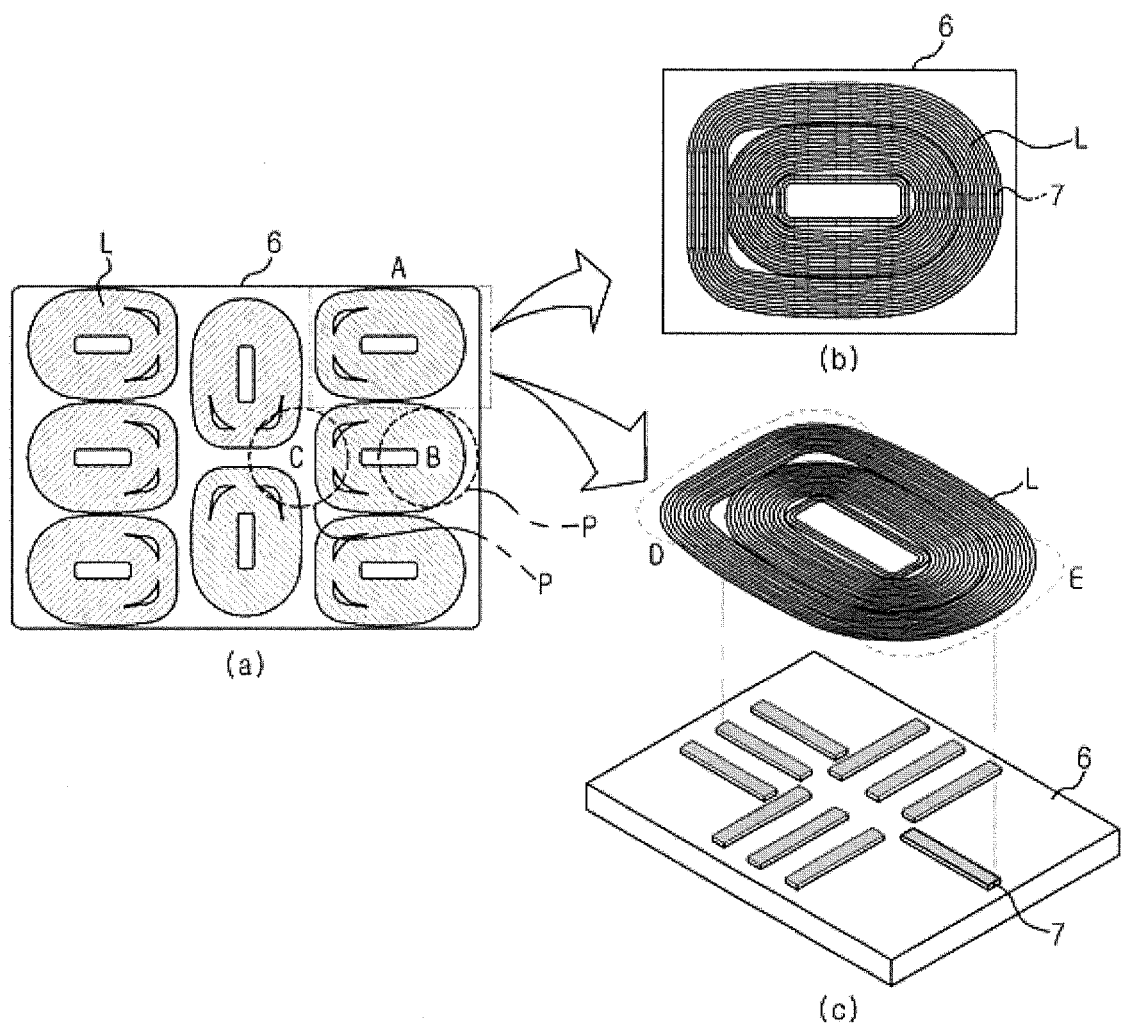
FIG. 10 is a view illustrating a case in which a ferrite magnet is installed below the heating coil that is provided on the induction heating cooker according to the embodiment of the present disclosure.

FIG. 10 is a view illustrating a case in which a ferrite magnet is installed below the heating coil provided on the induction heating cooker according to the embodiment of the present disclosure.

Referring to a drawing (a) of FIG. 10, eight heating coils (L) are disposed on the support plate 6 while forming three columns. A drawing (b) of FIG. 10 represents an enlarged view of an area of "A" of the drawing (a). A drawing (c) of FIG. 10 represents a stacked structure of an area of "A".

If a vessel (P) is placed on an area adjacent to the peripheral part of the cooking plate 3, the area causing a high vessel occupancy ratio, thereby increasing the possibility to determine that a heating coil (L) has a vessel placed thereon. However, if a vessel (P) is placed in the center of the cooking plate 3 shown as an area of "C" of the drawing (a) of FIG. 10, that is, an area where heating coils (L) make contact with each other, a low vessel occupancy ratio is resulted in the area due to the dead zone between heating coils (L), thereby increasing the possibility that a heating coil (L) is determined not to have a vessel placed thereon even if the heating coil (L) has a vessel placed thereon and the heating coil (L) is not operated and thus a cooking operation is not performed.

According to the embodiment, the heating coil (L) is provided in the D shape and extends laterally. In addition, the heating coils (L) are disposed such that a straight line portion of each heating coil (L) faces a contact area between the heating coils (L), thereby increasing the vessel occupancy ratio. In addition, a plurality of ferrite magnets 7 are disposed below heating coils (L) such that a larger number of ferrite magnets are disposed on the straight line portion of the heating coil (L) shown as an area "D" of a drawing (c) of FIG. 10 than the curved line portion of the heating coil (L) shown as an area "E" of a drawing (c) of FIG. 10, so that the position of a heating coil (L) on which a vessel is placed is precisely detected.

If the ferrite magnet 7 is disposed below the heating coil (L), the inductance of the heating coil (L) is increased, thereby increasing the amount of electric current flowing through the heating coil (L) having the ferrite magnet 7 disposed therebelow as compared with a heating coil (L) without having the ferrite magnet 7. In addition, when a high frequency power source is supplied to heating coils having ferrite magnets, the more the ferrite magnets are installed on a heating coil, the more electric current flows through the heating coil.

Accordingly, the ferrite magnets 7 are more densely on the straight line portion "D" of a heating coil (L) than the curved line portion "E", the heating coil (L) disposed in the center of the cooking plate 3 shown as the area of "C" of the drawing (a) of FIG. 10, that is, an area where heating coils (L) make contact with each other. In this manner, more electric current flows through the straight line portion "D" than that of the curved line portion "E". That is, referring to the drawing (c) of FIG. 10, three ferrite magnets are disposed below the straight line portion "D" of a heating coil (L) and one ferrite magnet is disposed below the curved line portion "E". If a high frequency power is supplied to the heating coil (L), more current flows through the straight line portion "D" of the heating coil (L) than the curved line portion "E" of the heating coil (L). Accordingly, although the area "D" has a low vessel occupancy ratio, the electric current flowing through the area "D" is greater than other area, making it easy to determine that a vessel is placed on the heating coil (L) and to operate the heating coil (L) for cooking foods.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. An induction heating cooker comprising:
   a cooking plate on which a cooking vessel is placed;
   a plurality of heating coils disposed while being adjacent to one another below the cooking plate; a Printed Circuit Board (PCB) on which circuits configured to drive the heating coils are placed; and
   a heat radiation plate placed on the PCB, to absorb heat generated from the circuit and to dissipate the absorbed heat to outside,
   wherein the PCB is divided into a high frequency circuit part on which circuits characterized by high frequency are placed and a low frequency circuit part on which circuits characterized by low frequency are placed, and the high frequency circuit part is separated from the low frequency circuit part by the heat radiation plate.

2. The induction heating cooker of claim 1, wherein a first high frequency circuit part is disposed on a left edge of the PCB and a second high frequency circuit part is disposed on a right edge of the PCB, and the low frequency circuit part is disposed on the PCB between the first and second high frequency circuit parts, and
   wherein the low frequency circuit part is separated from the first high frequency circuit part by a first heat radiation plate and from the second high frequency circuit part by a second heat radiation plate.

3. The induction heating cooker of claim 1, wherein the circuits configured to drive the heating coils comprise:

a plurality of rectifier circuits configured to perform rectification on an input alternating current (AC) power source to output a rectified ripple voltage;
   a plurality of inverter circuits configured to supply a high frequency power source to the heating coils; and
   a plurality of subsidiary control circuits configured to control an operation of the heating coils.

4. The induction heating cooker of claim 3, wherein the plurality of rectifier circuits and the plurality of inverter circuits are placed on the high frequency circuit part of the PCB.

5. The induction heating cooker of claim 3, wherein the plurality of subsidiary control circuits are placed on the low frequency circuit part of the PCB.

6. The induction heating cooker of claim 3, wherein the rectifier circuit comprises a diode bridge.

7. The induction heating cooker of claim 3, wherein the inverter circuit comprises a switching device, which is configured to supply a resonance voltage to the heating coil according to a switching control signal of the subsidiary control circuit, and a resonance condenser which is connected in parallel to the heating coil and achieves a continuous resonance in cooperation with the heating coil by an input voltage, wherein the switching device comprises an Insulted Gate Bipolar Transistor (IGBT).

8. The induction heating cooker of claim 1, wherein respective wire connecting parts are installed on the left edge of the PCB and the right edge of the PCB, each wire connecting part being configured to connect a wire, for driving current to a corresponding heating coil, to a corresponding one of the first high frequency circuit part and the second high frequency circuit part.

9. The induction heating cooker of claim 1, wherein the heating coil is provided in a shape of a D that extends laterally.

10. The induction heating cooker of claim 1, wherein a periphery of the heating coil comprises a straight line portion and an arched line portion having a parabola shape.

11. The induction heating cooker of claim 10, wherein the arched line portion having the parabola shape is disposed facing a peripheral part of the cooking plate.

12. An induction heating cooker comprising:
    a cooking plate on which a vessel is placed;
    a plurality of heating coils disposed below the cooking plate while being adjacent to one another;
    a plurality of magnets disposed below each of the plurality of heating coils and to increase an inductance of the heating coils;
    a plurality of detection parts configured to detect a value of electric current flowing through each of the heating coils; and
    a control part configured to determine whether a vessel is placed on a heating coil of the heating coils based on a corresponding one of the detected values,
    wherein the heating coil is provided in a D shape that extends laterally.

13. The induction heating cooker of claim 12, wherein a periphery of the heating coil comprises a straight line portion and an arched line portion having a parabola shape.

14. The induction heating cooker of claim 13, wherein the arched line portion having the parabola shape is disposed facing a peripheral part of the cooking plate.

15. The induction heating cooker of claim 14, wherein the control part determines that the vessel is placed on the heating coil based on whether the corresponding one value meets a threshold.

16. The induction heating cooker of claim 15, wherein the threshold represents a value of electric current flowing through the heating coil when a vessel formed using magnetic material occupies a predetermined critical ratio of an area of the heating coil.

17. The induction heating cooker of claim 12, wherein the plurality of heating coils, including the heating coil and the respectively adjacent different heating coils, comprise first through eighth heating coils, the eight heating coils being arranged in first through third columns.

18. The induction heating cooker of claim 17, wherein the first through third heating coils are disposed on the first column such that a curved line portion of each of the first through third heating coils faces a left edge of the cooking plate,
- the fourth and fifth heating coils are disposed on the second column such that a curved line portion of the fourth and fifth heating coils faces an upper edge and a lower edge of the cooking plate, respectively, and
- the sixth through eighth heating coils are disposed on the third column such that a curved line portion of each of the sixth through eighth heating coils faces a right edge of the cooking plate.

* * * * *